United States Patent [19]

Green et al.

[11] 4,397,582
[45] Aug. 9, 1983

[54] METHOD OF CREATING A COLD WATER CONDUIT TO BE USED IN OCEAN THERMAL ENERGY CONVERSION SYSTEMS

[75] Inventors: William L. Green, New Orleans; Dennis E. Calkins, Metairie; Edward A. Landers, Jr., Covington; Daniel W. Gray, New Orleans, all of La.

[73] Assignee: McDermott Incorporated, New Orleans, La.

[21] Appl. No.: 249,580

[22] Filed: Mar. 31, 1981

[51] Int. Cl.³ .............. E21D 9/08; E21D 10/00; E21B 7/04
[52] U.S. Cl. .................... 405/137; 405/138; 175/61
[58] Field of Search .............. 405/52, 133, 136–140, 405/83; 299/13; 175/10, 61

[56] References Cited

U.S. PATENT DOCUMENTS

| | | | |
|---|---|---|---|
| 1,569,419 | 1/1926 | Chase | 405/83 |
| 2,001,576 | 5/1935 | Johnson | 175/10 |
| 3,574,405 | 4/1971 | Schimada et al. | 299/13 X |
| 3,772,891 | 11/1973 | Raistakka | 405/83 |
| 4,003,440 | 1/1977 | Cherrington | 175/61 |
| 4,027,734 | 6/1977 | Horvath | 175/61 X |
| 4,069,760 | 1/1978 | Eckels | 299/13 |
| 4,234,269 | 11/1980 | Person et al. | 405/52 X |

Primary Examiner—David H. Corbin
Assistant Examiner—Nancy J. Pistel
Attorney, Agent, or Firm—Robert J. Edwards; J. Henry Muetterties; James C. Simmons

[57] ABSTRACT

A method of creating a cold water conduit for use with an ocean thermal energy conversion plant by drilling and blasting at least one passageway completely through an underwater land formation.

3 Claims, 12 Drawing Figures

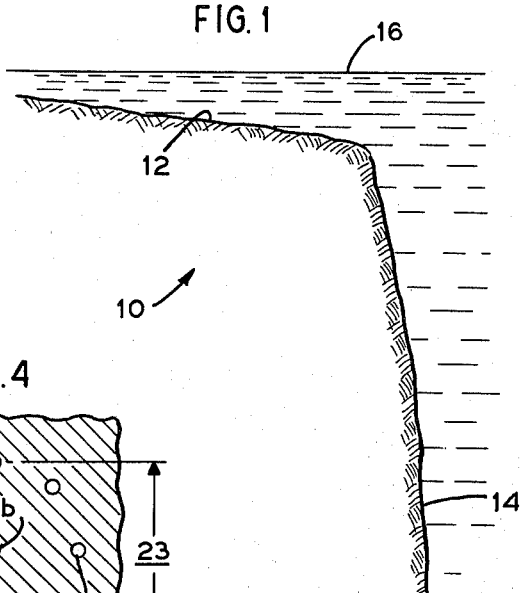
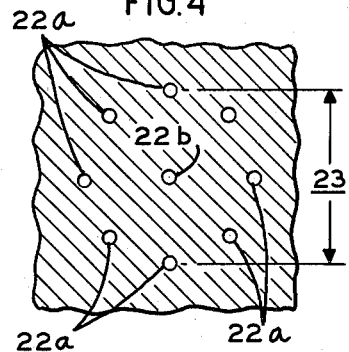
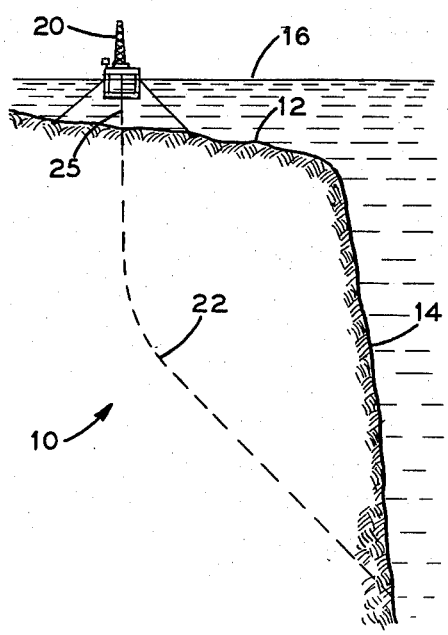
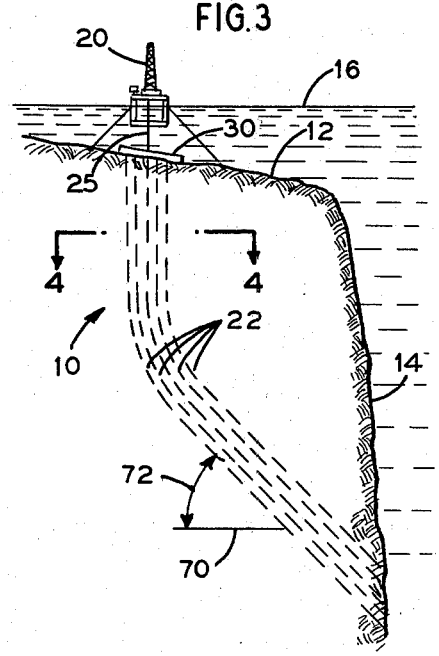

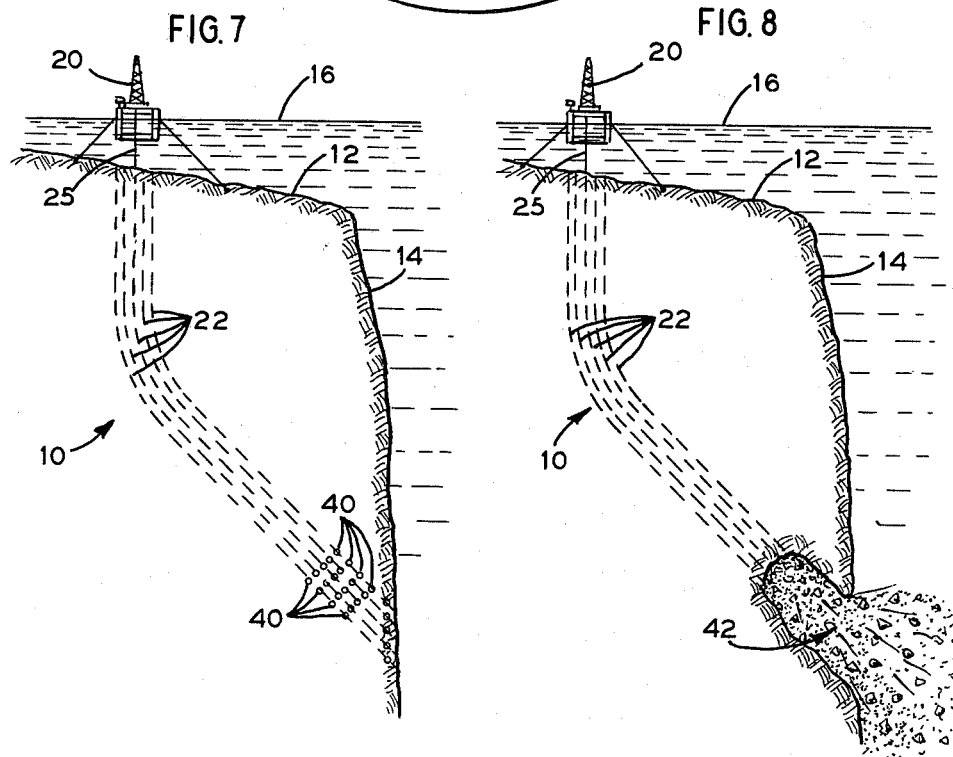

METHOD OF CREATING A COLD WATER CONDUIT TO BE USED IN OCEAN THERMAL ENERGY CONVERSION SYSTEMS

TECHNICAL FIELD

This invention relates to ocean thermal energy conversion power plants in general and more particularly to a method of creating a cold water conduit to be used in association with such power plants.

BACKGROUND ART

The high cost and dwindling supply of fossil fuels have created intense interest in alternate sources of energy. One such alternate energy source involves the utilization of the temperature difference between warm surface seawater and cooler subsurface seawater. This general concept is known as ocean thermal energy conversion or "OTEC".

In one popular version of an OTEC power plant, warm surface seawater is used to vaporize a working fluid. The vapor is used to drive turbine generators which ultimately produce electricity. After the vapor has passed through the turbines, cool subsurface seawater is used to condense the vapor, thereby completing the working fluid cycle.

The cool subsurface seawater required for this process is located roughly 1500 to 3000 feet below the water surface. In the design of many OTEC power plants, it is necessary to bring large quantities of this subsurface seawater to the surface. To accomplish this, it is envisioned that a long pipe commonly referred to as a "cold water conduit" will be used, said conduit to extend from the surface downward roughly 1500 to 3000 feet. It is anticipated that the conduit must be approximately 5 to 120 feet in diameter for OTEC powerplants from 1 to 400 megawatts, respectively.

The need for such a huge conduit presents several severe problems. The conduit must be fabricated of a material which is strong enough to withstand the tremendous dynamic wave loads as well as the large static load presented by the weight of such a long vertical conduit. Other problems involve the method of installing such a conduit and maintaining its position with respect to the OTEC plant located on the surface.

SUMMARY OF THE INVENTION

The invention circumvents the need for solving the aforementioned problems involving the cold water conduit. The invention is directed toward a method of creating a cold water conduit to be used in association with ocean thermal energy conversion systems and the like. The method involves the drilling of a passageway through an underwater land formation, said passageway to be used as the cold water conduit. More specifically, the passageway will be drilled through an underwater land formation which is adjacent to the intersection of a land shelf and a land slope, the passageway extending from the land shelf to the land slope. The cross sectional area of the passageway may be increased if desired by detonating explosive charges within the passageway at progressively higher elevations.

BRIEF DESCRIPTION OF THE DRAWINGS

FIG. 1 is an elevation view in cross section of the type of underwater land formation in which the invention is practiced.

FIG. 2 is an elevation view of the land formation shown in FIG. 1 with a drilling rig in position and a passageway extending through said land formation.

FIG. 3 is an elevation view of the land formation shown in FIG. 2 with a plurality of passageways and a template beneath the rig.

FIG. 4 is a view taken along lines A—A in FIG. 3.

FIG. 5 is an elevation view of a template.

FIG. 6 is a plan view of the template shown in FIG. 5.

FIG. 7 is an elevation view of the land formation shown in FIG. 3 with explosive charges positioned inside the passageways.

FIG. 8 is a view of the land formation shown in FIG. 7 upon detonation of the charges.

BEST MODE FOR CARRYING OUT THE INVENTION

Figure 9:
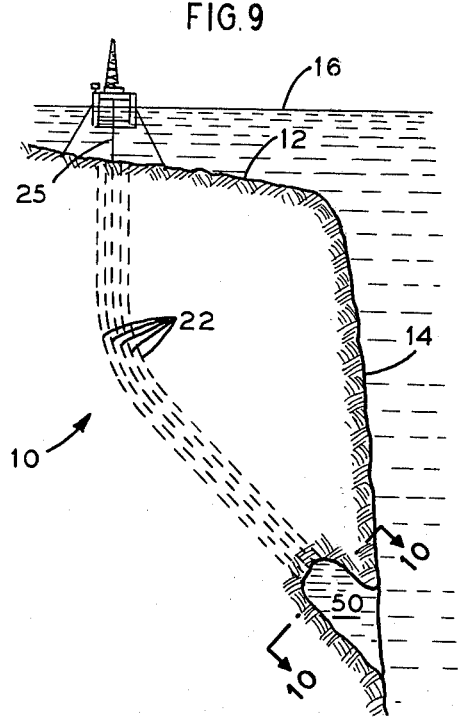
FIG. 9 is a view of the land formation shown in FIG. 8 after the explosion has created a conduit.

FIG. 1 shows the type of underwater land formation in which the invention is intended to be worked. The underwater land formation 10 is located adjacent to the intersection of an underwater land shelf 12 and an underwater land slope 14. Said underwater land formation could be adjacent to the intersection of a continental shelf 12 and continental slope 14. It could also be adjacent to the intersection of an island shelf 12 and an island slope 14 or any other similar underwater land shelf and underwater land slope.

In the preferred embodiment of the invention, slope 14 has an orientation ranging from vertical to roughly 45° from the vertical. Further in the preferred embodiment, shelf 12 lies roughly 250-350 feet below the water surface 16. Underwater land formation 10 is preferably comprised of hard, compacted, rock-like material.

FIG. 2 shows a mobile marine drilling rig 20 positioned above the underwater land formation 10. Drilling member 25 of rig 20 is used to drill at least one passageway 22 through land formation 10. Generally, passageway 22 is drilled substantially vertically for a distance and is then drilled directionally toward slope 14 using well known directional drilling techniques. When drilling has been completed, passageway 22 extends from shelf 12 to slope 14.

In the preferred embodiment, as shown in FIG. 3, a plurality of substantially parallel passageways 22 are drilled through land formation 10. Said passageways are drilled with the aid of a template 30. Template 30, shown in FIGS. 5 and 6, has a plurality of holes 32.

TEMPLATE 30 is used by placing it on shelf 12 at the desired location where the drilling of passageways 22 is to occur. The holes 32 in template 30 are arranged so as to complement the desired arrangement of passageways 22 relative to each other.

The preferred arrangement of passageways 22 is shown in FIG. 4. The passageways are drilled such that a cross section taken anywhere along the length of said passageways reveals a circular pattern wherein circumferential passageways 22a surround center passageway 22b. The circle formed by the circumferential passageways 22a has a diameter designated by the numeral 23.

Passageways 22 are preferably drilled sequentially, beginning with center passageway 22b. Passageway 22b is started by inserting the tip of drilling member 25 through the center hole 32b of template 30. After passageway 22b has been completely drilled from shelf 12 to slope 14, the first of the circumferential passageways 22a may be started.

Said circumferential passageway 22a is started by inserting the tip of drilling member 25 through the desired circumferential hole 32a of template 30. Drilling is then commenced and said circumferential passageway 22a is drilled substantially parallel to passageway 22b, from shelf 12 to slope 14. Existing state-of-the-art drilling techniques allow center passageway 22b to be used as a reference for maintaining substantial parallelism between said center passageway 22b and the circumferential passageway 22a which is being drilled.

Using template 30 to locate the desired starting points for the remaining passageways 22a, the drilling process is repeated over and over again for each passageway 22a to be drilled.

The relative arrangement, number, and spacing of holes 32 in template 30, hence the relative arrangement, number, and spacing of passageways 22, will vary depending upon the soil conditions present in land formation 10.

Referring now to FIG. 7, after all passageways 22 have been completely drilled, a first group of explosive charges 40 is placed into at least one and preferably all of said passageways 22. As shown in FIG. 7, said first group of charges 40 is positioned at the lower end of passageways 22. The charges are then detonated.

Figure 10:
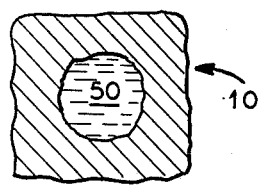
FIG. 10 is a view taken along lines B—B in FIG. 9.

The resulting blast causes that portion of underwater land formation 10 which is adjacent to the charges 40 in passageways 22 to fragment, as illustrated in FIG. 8. The fragmented rubble 42, due to the combined forces of gravity and the explosion, falls from underwater land formation 10, thereby creating a tunnel or conduit 50 as shown in FIGS. 9 and 10.

The diameter of conduit 50 is roughly equal to dimension 23 shown in FIG. 4. The length of conduit 50 created by detonating the group of explosive charges 40 depends upon several factors. These factors, which will vary according to the soil conditions present in underwater land formation 10, include the number, placement and spacing of explosive charges 40 along the length of passageways 22.

Figure 11:
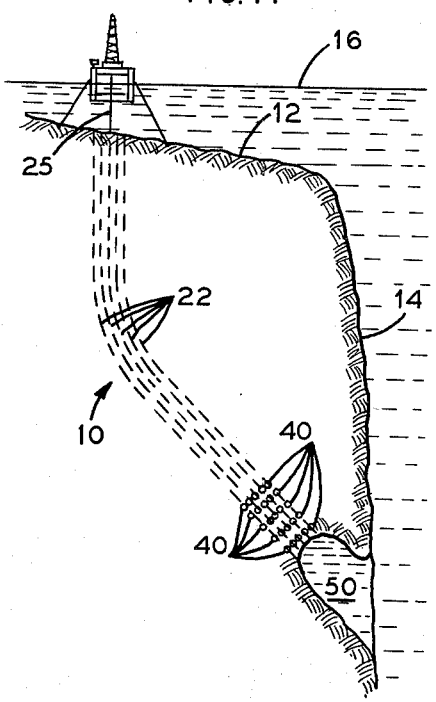
FIG. 11 is a view showing explosive charges in place near the conduit.
Figure 12:
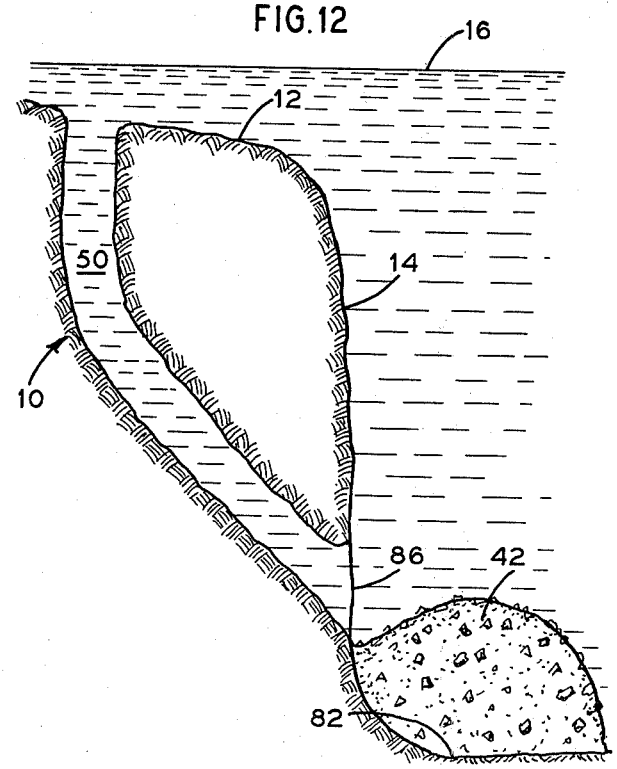
FIG. 12 is a view of the land formation shown in FIG. 11 with the conduit extending completely through said land formation.

The process of introducing and then detonating groups of explosive charges 40 in passageways 20 is repeated at progressively higher elevations. For example, FIG. 11 shows a second group of charges 40 which have been positioned near the upper end of conduit 50 and are ready to be detonated, thereby increasing the length of conduit 50. This process is repeated until conduit 50 extends from slope 14 completely through underwater land formation 10 to shelf 12, as illustrated in FIG. 12.

The orientation of conduit 50 in underwater land formation 10 is substantially the same as that of the plurality of passageways 22 considered collectively. As shown in FIG. 12, conduit 50 can be utilized as a cold water conduit for an OTEC power plant.

In the preferred embodiment of this invention, the step of introducing explosive charges 40 into passageways 22 is accomplished by lowering said charges from the top of said passageways down through the passageways to the desired location where detonation is to occur. The drilling rig 20 which was used to drill passageways 22 can be utilized to lower the charges down the passageways. It is recommended, however, that rig 20 be moved a safe distance away from the area when detonating the highest level of explosive charges, in case some of the rubble is thrust upwards.

In the preferred embodiment of the invention, the slope of conduit 50 from the horizontal, at all points along the length of conduit 50, is greater than the angle of repose of the rubble 42 created by detonating the explosive charges. This assures that gravitational forces will cause the rubble to tumble completely out of the conduit, leaving a clear, unobstructed conduit 50.

Since the spatial orientation of conduit 50 is substantially the same as that of passageways 22, said passageways are drilled such that at all points along the length of the passageways, especially along the points of least passageway inclination, the angle formed between a passageway 22 and the horizontal is greater than the angle of repose of the rubble created by detonating the explosive charges.

As an illustration, see FIG. 3 where angle 72 is formed by passageway 22 and a horizontal line 70 drawn across the passageway at a point of least passageway inclination. The angle of repose of the rubble expected to be produced by the disclosed process is roughly 35°. Therefore, to assure that said rubble will tumble out of conduit 50, angle 72 should be at least 35° and preferably not less than 45°.

The minimum acceptable degree of angle 72 may vary, depending ultimately upon the angle of repose of the rubble 42 created by the detonation of charges 40. Several factors influence said angle of repose, including the explosive force of the charges 40 and the distance between adjacent charges as positioned in passageways 22.

The force of the charges 40 and the distance between adjacent charges are determined in large part by the nature of the underwater land formation 10 from which the rubble 42 is derived. In the preferred embodiment of the invention, core samples are taken from the desired formation 10 prior to or during the initial phase of drilling passageways 22.

Using well known principles of the earth sciences, these core samples will facilitate the calculation of the various factors described hereinabove. Said core samples will also provide information concerning the general advisability of attempting to practice this invention in the underwater land formation 10 from which the samples were taken.

Referring now to FIG. 12, underwater land formation 10, in addition to being comprised of material which is hard and stable enough to allow the disclosed process to be practiced, must also be situated such that there is sufficient clearance between the bottom opening 86 of conduit 50 and the seabed 82. This clearance must be such that the accumulated pile of rubble 42 will not block conduit opening 86. In the preferred embodiment of the invention, opening 86 is located approximately 1500 to 3000 feet below the water surface 16.

While in accordance with the provisions of the statutes, there is illustrated and described herein specific embodiments of the invention, those skilled in the art will understand that changes may be made in the form of the invention covered by the claims, and certain features of the invention may sometimes be used to advantage without a corresponding use of the other features.

The embodiments of the invention in which an exclusive property or privilege is claimed are defined as follows:

1. A method of creating a conduit to be used in association with ocean thermal energy conversion systems and the like, said method comprising the steps of drilling at least one passageway through an underwater land formation, wherein the passageway is directionally drilled so that the top of the passageway is located on an underwater land shelf and the bottom of the passageway is located on an underwater land slope, and repeatedly introducing and then detonating at least one explosive charge in the passageway at progressively higher elevations.

2. The method of claim 1 wherein the passageway is drilled so that the angle formed by the passageway and the horizontal is greater than the angle of repose of the rubble created by detonating the explosive charge.

3. The method of claim 1 wherein a plurality of substantially parallel passageways are drilled through said underwater land formation, said passageways being arranged with respect to one another in a substantially circular pattern.

* * * * *